US012615701B2

(12) United States Patent
Huang et al.

(10) Patent No.: US 12,615,701 B2
(45) Date of Patent: Apr. 28, 2026

(54) METHOD OF COMBINING LIGHT, INTELLIGENT TERMINAL AND STORAGE MEDIUM

(71) Applicant: APUTURE IMAGING INDUSTRIES CO., LTD., Shenzhen (CN)

(72) Inventors: Xuesi Huang, Shenzhen (CN); Xiangjun Zhou, Shenzhen (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 733 days.

(21) Appl. No.: 17/887,566

(22) Filed: Aug. 15, 2022

(65) Prior Publication Data

US 2023/0180362 A1 Jun. 8, 2023

(30) Foreign Application Priority Data

Dec. 2, 2021 (CN) ........................ 202111459726.8

(51) Int. Cl.
*H05B 45/28* (2020.01)

(52) U.S. Cl.
CPC .................................... *H05B 45/28* (2020.01)

(58) Field of Classification Search
CPC ........... H05B 45/28; Y02B 20/40; H04N 9/73
See application file for complete search history.

(56) References Cited

U.S. PATENT DOCUMENTS

| | | | | |
|---|---|---|---|---|
| 9,485,813 | B1 * | 11/2016 | Lewis | H05B 45/44 |
| 10,652,962 | B1 * | 5/2020 | Qiu | H05B 45/40 |
| 2012/0242242 | A1 * | 9/2012 | Linz | H05B 45/28 315/210 |
| 2013/0069561 | A1 * | 3/2013 | Melanson | H05B 45/28 315/297 |

(Continued)

FOREIGN PATENT DOCUMENTS

| | | |
|---|---|---|
| CN | 110888293 A | 3/2020 |
| CN | 111315071 A | 6/2020 |
| CN | 112213907 A | 1/2021 |

(Continued)

OTHER PUBLICATIONS

The First Office Action and Search Report Dated Jan. 11, 2022, for Aputure Imaging Industries Co., Ltd., from China Application No. 202111459726.8 and Its Translation of Office Action Into English (13 pages).

(Continued)

*Primary Examiner* — Minh Tran
(74) *Attorney, Agent, or Firm* — Rivka Friedman

(57) ABSTRACT

The present disclosure discloses a method of combining light, an intelligent terminal and a storage medium. The method includes: according to a current sampling temperature, determining corresponding relationship between control degree and illuminance of each of LEDs at the current sampling temperature; according to a target light combining value and the corresponding relationship between the control degree and the illuminance of each of the LEDs at the (Continued)

current sampling temperature, determining control degree of each of the LEDs at the current sampling temperature; according to the control degree of each of the LEDs at the current sampling temperature, controlling each of the LEDs to combine light.

14 Claims, 2 Drawing Sheets

(56) References Cited

U.S. PATENT DOCUMENTS

2020/0367331 A1* 11/2020 Qiu ........................ H05B 45/10

FOREIGN PATENT DOCUMENTS

| | | | |
|---|---|---|---|
| CN | 112218403 | A | 1/2021 |
| CN | 112735324 | A | 4/2021 |
| CN | 113192470 | A | 7/2021 |
| DE | 102007044556 | A1 | 9/2007 |
| DE | 102019125268 | A1 | 3/2021 |
| WO | 2015176668 | A1 | 11/2015 |

OTHER PUBLICATIONS

German Office Action For 10 2022 131 600.9 Mailed on Feb. 17, 2025.

* cited by examiner

METHOD OF COMBINING LIGHT, INTELLIGENT TERMINAL AND STORAGE MEDIUM

CROSS REFERENCE TO RELATED APPLICATION

This application claims priority of Chinese Application No. 202111459726.8 filed on Dec. 2, 2021, which title is "Method Of Combining Light, Intelligent Terminal and Storage Medium", and the entire disclosure of which is incorporated by reference in this application.

FIELD OF INVENTION

The disclosure relates to a field of lighting technology, and in particular to a method for combining light, an intelligent terminal and a storage medium.

BACKGROUND OF INVENTION

Combination of lights refers to a process in which two or more lights are mixed and superimposed according to different illuminances to obtain a target light combining value. A Light Emitting Diode (LED) can efficiently convert electrical energy into light energy and is widely used for combining light. In an existing light combining process, with change of temperature, illuminance of LED changes greatly, causing color temperature to drift.

Therefore, existing technology still needs to be improved and developed.

SUMMARY OF INVENTION

In view of above-mentioned defects of the prior art, a technical problem solved by the present disclosure is to provide a method of combining light, an intelligent terminal and a storage medium, in order to alleviate a problem of color temperature drift caused by temperature changes in an existing method of combining light.

Solutions adopted by this disclosure comprise as follows.

In a first aspect, an embodiment of the present disclosure provides a method of combining light, wherein the method comprises: according to a current sampling temperature, determining corresponding relationship between control degree and illuminance of each of LEDs at the current sampling temperature; according to a target light combining value and the corresponding relationship between the control degree and the illuminance of each of the LEDs at the current sampling temperature, determining control degree of each of the LEDs at the current sampling temperature; according to the control degree of each of the LEDs at the current sampling temperature, controlling each of the LEDs to combine light.

In the method of combining light, the determining corresponding relationship between control degree and illuminance of each of LEDs at the current sampling temperature comprises: according to the current sampling temperature and relationship between temperature and light efficacy corresponding to each of the LEDs, determining the light efficacy of each of the LEDs at the current sampling temperature; according to the light efficacy of each of the LEDs at the current sampling temperature and predetermined basic information, determining corresponding relationship between control degree and illuminance of each of the LEDs at the current sampling temperature; wherein, the basic information comprises light efficacy of each of the LEDs at a reference temperature and corresponding relationship between control degree and illuminance of each of the LEDs at the reference temperature.

In the method of combining light, the determining corresponding relationship between control degree and illuminance of each of the LEDs at the current sampling temperature comprises: according to the light efficacy of each of the LEDs at the current sampling temperature and the light efficacy of each of the LEDs at the reference temperature, determining a light efficacy ratio of each of the LEDs at the current sampling temperature; according to the light efficacy ratio of each of the LEDs at the current sampling temperature and the corresponding relationship between control degree and illuminance of each of the LEDs at the reference temperature, determining the corresponding relationship between the control degree and the illuminance of each of the LEDs at the current sampling temperature.

In the method of combining light, the light efficacy ratio of each of the LEDs at the current sampling temperature is equal to the light efficacy of each of the LEDs at the current temperature divided by the light efficacy of each of the LEDs at the reference temperature, and illuminance of each of the LEDs at the current sampling temperature is equal to multiplication of illuminance of each of the LEDs at the reference temperature and the light efficacy ratio of each of the LEDs at the current sampling temperature.

In the method of combining light, the determining the relationship between the temperature and the light efficacy corresponding to each of the LEDs comprises: according to light efficacy values of each of the LEDs at different temperatures, determining a temperature v.s. light efficacy curve corresponding to each of the LEDs; obtaining the relationship between the temperature and the light efficacy of each of the LEDs by respectively fitting the temperature v.s. light efficacy curve corresponding to each of the LEDs.

In the method of combining light, the temperature v.s. light efficacy curve is fitted by means of one of least squares method, polynomial fitting and exponential fitting.

In the method of combining light, the light efficacy values of each of the LEDs at different temperatures are measured as power of each of the LEDs is adjusted to a maximum value.

In the method of combining light, the determining control degree of each of the LEDs at the current sampling temperature comprises: according to the target light combining value, determining the illuminance of each of the LEDs at the current sampling temperature; according to the illuminance of each of the LEDs at the current sampling temperature and the corresponding relationship between the control degree and the illuminance of each of the LEDs at the current sampling temperature, determining the control degree of each of the LEDs at the current sampling temperature.

In the method of combining light, the target light combining value comprises target color and target illuminance, and the determining the illuminance of each of the LEDs at the current sampling temperature comprises: determining illuminance percentage of each of the LEDs based on the target color; determining the illuminance of each of the LEDs at the current sampling temperature based on the target illuminance and the illuminance percentage of each of the LEDs.

In the method of combining light, the illuminance of each of the LEDs at the current sampling temperature is equal to multiplication of the target illuminance and the illuminance percentage of each of the LEDs.

In the method of combining light, the controlling each of the LEDs to combine light comprises: outputting the control degree of each of the LEDs at the current sampling temperature to a LED driver circuit of each of the LEDs; by the LED driving circuit of each of the LEDs, according to the control degree of each of the LEDs at the current sampling temperature, driving each of the LEDs to combine light.

Before the determining the corresponding relationship between the control degree and the illuminance of each of the LEDs at the current sampling temperature, the method of combining light further comprises: comparing the current sampling temperature with a previous sampling temperature; When difference between the current sampling temperature and the previous sampling temperature is less than a preset temperature threshold, determining control degree of each of the LEDs at the previous sampling temperature as the control degree of each of the LEDs at the current sampling temperature.

In a second aspect, an embodiment of the present disclosure provides a device of combining light, wherein the device comprises: a relationship determination module, used to determine corresponding relationship between control degree and illuminance of each of LEDs at a current sampling temperature, according to the current sampling temperature; a parameter determination module, used to determine the control degree of each of the LEDs at the current sampling temperature, according to a target light combining value and the corresponding relationship between the control degree and the illuminance of each of the LEDs at the current sampling temperature; a light combining control module, used to control each of the LEDs to combine light, according to the control degree of each of the LEDs at the current sampling temperature.

In a third aspect, an embodiment of the present disclosure provides an intelligent terminal comprising: a processor and a storage medium communicatively connected to the processor and suitable for storing a plurality of instructions, wherein the processor is suitable for invoking the instructions in the storage medium so as to be configured to perform steps of implementing the method of combining light.

In a fourth aspect, an embodiment of the present disclosure provides a computer-readable storage medium on which a plurality of instructions are stored, and the instructions are suitable for being loaded and executed by a processor to perform steps of the method of combining light.

An advantageous effect of this disclosure is as follows. An embodiment of the present disclosure first determines corresponding relationship between control degree and illuminance of each of LEDs at the current sampling temperature, then determines the control degree of each of the LEDs at the current sampling temperature according to a target light combining value and the corresponding relationship between the control degree and the illuminance of each of the LEDs at the current sampling temperature, and finally controls each of the LEDs to combine light according to the control degree of each of the LEDs at the current sampling temperature. Therefore, the illuminance of each of the LEDs can be compensated according to temperature change, and color temperature drift caused by the temperature change can be alleviated by compensating the illuminance of each of the LEDs, due to the fact the corresponding relationship between control degree and illuminance of each of LEDs at the current sampling temperature is determined, and the control degree of each of the LEDs at the current sampling temperature is determined according to a target light combining value and the corresponding relationship between the control degree and the illuminance of each of the LEDs at the current sampling temperature.

DESCRIPTION OF DRAWINGS

Accompanying figures to be used in technical description in embodiments of the present disclosure or the prior art will be described in brief to more clearly illustrate technical solutions of the embodiments or the prior art. It is obvious that the accompanying figures described below illustrate only part of the embodiments of the present disclosure, and those skilled in the art can derive further figures from these figures without making any inventive efforts.

DETAILED DESCRIPTION OF PREFERRED EMBODIMENTS

Figure 1:
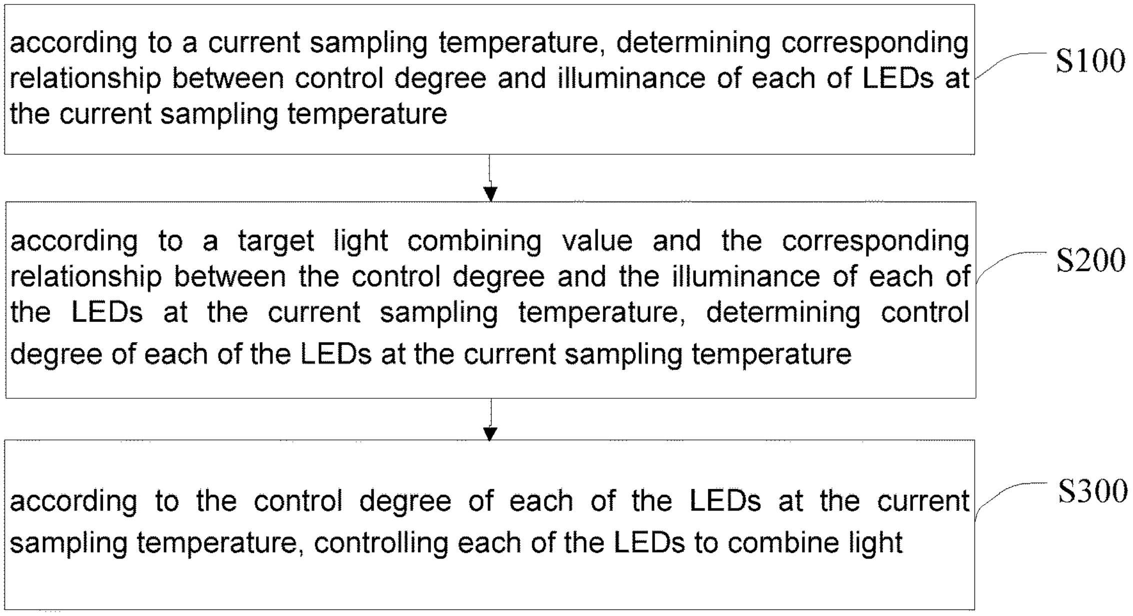
FIG. 1 is a schematic flowchart of the method of combining light provided by an embodiment of the present disclosure.

In order to make purpose, technical solutions and advantages of the present disclosure clearer and more explicit, the present disclosure is described in further detail with reference to the accompanying drawings and in conjunction with embodiments. It should be understood that the specific embodiments described herein are intended to explain the present disclosure only and are not intended to limit the present disclosure.

It should be noted that if there are directional indications (such as up, down, left, right, front, back, etc.) involved in the embodiments of the present disclosure, the directional indications are only used to explain relative position among components and movement of components at a certain posture (as shown in the accompanying drawings). If the specific posture changes, the directional indication also changes accordingly.

Inventors found that in the process of combining light, as long as color coordinates and illuminance of each of the LEDs involved in combination of light remain constant, color temperature is constant; as the temperature increases, color coordinates of the LEDs do not change significantly, but illuminance of the LEDs changes significantly, resulting in drift in the color temperature. Analysis result is that, increase in the temperature leads to decrease in luminous efficacy of the LEDs, which in turn leads to change in the illuminance of the LEDs.

In order to solve problems of the prior art, this embodiment provides a method of combining light, by which the Illuminance of each of the LEDs can be compensated according to temperature change, and color temperature drift caused by the temperature change can be mitigated by Illuminance compensation of each of the LEDs. In a specific implementation, first, according to a current sampling temperature, corresponding relationship between control degree and illuminance of each of LEDs at the current sampling temperature is determined. Second, according to a target light combining value and the corresponding relationship between the control degree and the illuminance of each of the LEDs at the current sampling temperature, the control degree of each of the LEDs at the current sampling temperature is determined. Finally, according to the control degree of each of the LEDs at the current sampling temperature, each of the LEDs is controlled to combine light. Therefore, the illuminance of each of the LEDs can be compensated according to temperature change, and color temperature drift caused by the temperature change can be alleviated by compensating the illuminance of each of the LEDs, due to the fact the corresponding relationship between control degree and illuminance of each of LEDs at the current sampling temperature is determined, and the control degree of each of the LEDs at the current sampling temperature is determined according to a target light combining value and the corresponding relationship between the control degree and the illuminance of each of the LEDs at the current sampling temperature.

Exemplary Method

Embodiments of the present disclosure provide a method of combining light, which can be applied to an intelligent terminal. Specifically, as shown in FIG. 1, the method comprises: step S100, according to a current sampling temperature, determining corresponding relationship between control degree and illuminance of each of LEDs at the current sampling temperature.

Specifically, the current sampling temperature is light combining temperature collected at current sampling moment. It can be obtained through a temperature sensor. Since temperature change will cause color temperature drift during a process of combining light, this embodiment collects the light combining temperature by the temperature sensor in real time or every preset time period to obtain the current sampling temperature, and according to the current sampling temperature, determines the corresponding relationship between the control degree and the illuminance of each of the LEDs at the current sampling temperature, so that in subsequent steps, according to the corresponding relationship between the control degree and the illuminance of each of the LEDs at the current sampling temperature, the illuminance of each of the LEDs is compensated.

In a specific embodiment, step S100 specifically comprises: step S110, according to the current sampling temperature and relationship between temperature and light efficacy corresponding to each of the LEDs, determining light efficacy of each of the LEDs at the current sampling temperature; step S120, according to the light efficacy of each of the LEDs at the current sampling temperature and predetermined basic information, determining corresponding relationship between control degree and illuminance of each of the LEDs at the current sampling temperature; wherein, the basic information comprises light efficacy of each of the LEDs at a reference temperature and corresponding relationship between control degree and illuminance of each of the LEDs at the reference temperature.

In consideration that the light efficacy of the LEDs will decrease with increase of temperature, in this embodiment, the corresponding relationship between the temperature and the light efficacy of each of the LEDs is determined in advance. After obtaining the current sampling temperature, according to the current sampling temperature and the corresponding relationship between the temperature and the light efficacy of each of the LEDs, the light efficacy of each of the LEDs at the current sampling temperature is determined. For example, the corresponding relationship between the temperature and the light efficacy of the LEDs is Efficacy=Fun(T), wherein Efficacy is light efficacy and T is temperature. After obtaining the current sampling temperature T_c, T_c is substituted into Efficacy=Fun(T) to obtain the light efficacy Efficacy_c=Fun(T) of the LEDs at the current sampling temperature T_c.

The basic information comprises the light efficacy of each of the LEDs at the reference temperature and the corresponding relationship between the control degree and the illuminance of each of the LEDs at the reference temperature. The light efficacy of each of the LEDs at the reference temperature can be determined with reference to the corresponding relationship between the temperature and the light efficacy of each of the LEDs. For example, there are 5 kinds of LEDs that combine light. The corresponding relationship between the temperature and the light efficacy of LED1 is Efficacy_1=Fun1(T). The corresponding relationship between the temperature and light efficacy of LED2 is Efficacy_2=Fun2(T). The corresponding relationship between the temperature and light efficacy of LED3 is Efficacy_3=Fun3(T). The corresponding relationship between the temperature and light efficacy of LED4 is Efficacy_4=Fun4(T). The corresponding relationship between the temperature and light efficacy of LED5 is Efficacy_5=Fun5(T). When the base temperature is T_d, the light effects of each of the LEDs at the reference temperature are as follows: Efficacy_1=Fun1(T_d), Efficacy_2=Fun2(T_d), Efficacy_3=Fun3(T_d), Efficacy_4=Fun4(T_d), and Efficacy_5=Fun5(T_d). The corresponding relationship between the control degree and the illuminance of each of the LEDs at the reference temperature is determined by measuring the illuminance of each of the LEDs under different control degrees at the reference temperature. For example, at the reference temperature T_d, the illuminance of each of the LEDs under control degree 1, control degree 2, control degree 3 . . . control degree N is measured, so that the corresponding relationship between the control degree and the illuminance of each of the LEDs at the reference temperature T_d can be obtained.

In this embodiment, after determining the light efficacy of each of the LEDs at the current sampling temperature, according to the light efficacy of each of the LEDs at the current sampling temperature, the light efficacy of each of the LEDs at the reference temperature, and the corresponding relationship between the control degree and the illuminance of each of the LEDs at the reference temperature, the corresponding relationship between the control degree and the illuminance of each of the LEDs at the current sampling temperature is determined.

In a specific embodiment, step S120 specifically comprises: step S121, according to the light efficacy of each of the LEDs at the current sampling temperature and the light efficacy of each of the LEDs at the reference temperature, determining a light efficacy ratio of each of the LEDs at the current sampling temperature; step S122, according to the light efficacy ratio of each of the LEDs at the current sampling temperature and the corresponding relationship between the control degree and the illuminance of each of the LEDs at the reference temperature, determining the corresponding relationship between the control degree and the illuminance of each of the LEDs at the current sampling temperature.

The basic information mentioned in the previous steps comprises the light efficacy of each of the LEDs at the reference temperature and the corresponding relationship between the control degree and the illuminance of each of the LEDs at the reference temperature. In this embodiment, when determining the corresponding relationship between the control degree and the illuminance of each of the LEDs at the current sampling temperature according to the basic information, firstly, the light efficacy ratio of each of the LEDs at the current sampling temperature is determined according to the light efficacy of each of the LEDs at the current sampling temperature and the light efficacy of each of the LEDs at the reference temperature. Calculation formula of the light efficacy ratio is D=Fun(T_c)/Fun(T_d), where D is the light efficacy ratio, T_c is the current sampling temperature, T_d is the reference temperature, Fun(T_c) is the light efficacy at the current sampling temperature, and Fun(T_d) is the light efficacy at the reference temperature. Still taking above mentioned 5 LEDs for combining light as an example, the light efficacy ratio of LED1 at the current sampling temperature is D1=Fun1(T_c)/Fun1(T_d). The light efficacy ratio of LED2 at the current sampling temperature is D2=Fun2(T_c)/Fun2(T_d). The light efficacy ratio of LED3 at the current sampling temperature is D3=Fun3(T_c)/Fun3(T_d). The light efficacy ratio of LED4 at the current sampling temperature is D4=Fun4(T_c)/Fun4(T_d). The light efficacy ratio of LED5 at the current sampling temperature is D5=Fun5(T_c)/Fun5(T_d).

After determining the light efficacy ratio of each of the LEDs at the current sampling temperature, according to the light efficacy ratio of each of the LEDs at the current sampling temperature and the corresponding relationship between the control degree and the illuminance of each of the LEDs at the reference temperature, the corresponding relationship between the control degree and the illuminance of each of the LEDs at the current sampling temperature is determined. The illuminance of each of the LEDs at the current sampling temperature and the illuminance of each of the LEDs at the reference temperature satisfy the formula: Lux_c=Lux_d*D=Lux_d*Fun(T_c)/Fun(T_d), where T_c is the current sampling temperature, T_d is the reference temperature, Fun (T_c) is the light effect at the current sampling temperature, Fun(T_d) is the light effect at the reference temperature, Lux_c is the illuminance of each of the LEDs at the current sampling temperature, and Lux_d is the illuminance of each of the LEDs at the reference temperature. When the corresponding relationship between the control degree and the illuminance of each of the LEDs at the reference temperature is known, i.e. the illuminances of each of the LEDs at the reference temperature when the control degree is respectively control degree 1, control degree 2, control degree 3 . . . control degree N are known, the illuminance of each of the LEDs at the current sampling temperature when the control degree is respectively control degree 1, control degree 2, control degree 3 . . . control degree N is determined according to the above relationship between the illuminance of each of the LEDs at the current sampling temperature and the illuminance of each of the LEDs at the reference temperature, i.e. the corresponding relationship between the control degree and the illuminance of each of the LEDs at the current sampling temperature is determined.

In a specific embodiment, in step S110, the determining the corresponding relationship between the temperature and the light efficacy of each of the LEDs comprises: step M110, according to the light efficacy values of each of the LEDs at different temperatures, determining the temperature v.s. light efficacy curve of each of the LEDs; step M120, obtaining the relationship between the temperature and the light efficacy of each of the LEDs by respectively fitting the temperature v.s. the light efficacy curve corresponding to each of the LEDs.

In order to determine the corresponding relationship between the temperature and light efficacy of each of the LEDs, in this embodiment, the light efficacy values of each of the LEDs at different temperatures are measured as power of each of the LEDs is adjusted to a maximum value. Then, according to the light efficacy values each of the LEDs at different temperatures, the temperature v.s the light efficacy curve of each of the LEDs is drawn, and the temperature v.s. light efficacy curve corresponding to each of the LEDs is respectively fitted to obtain the corresponding relationship between the temperature and the light efficacy of each of the LEDs. The temperature v.s. light efficacy curve is fitted by means of one of fitting methods e.g. least squares method, polynomial fitting, exponential fitting, etc., which will not be further described in this application.

Step S200: according to a target light combining value and the corresponding relationship between the control degree and the illuminance of each of the LEDs at the current sampling temperature, determining control degree of each of the LEDs at the current sampling temperature.

The target light combining value is a preset light combining value of each of the LEDs. In this embodiment, after determining the corresponding relationship between the control degree and the illuminance of each of the LEDs at the current sampling temperature, the illuminance of each of the LEDs at the current sampling temperature is determined according to the target light combining value. And according to the illuminance of each of the LEDs at the current sampling temperature and the corresponding relationship between the control degree and the illuminance of each of the LEDs at the current sampling temperature, the control degree of each of the LEDs at the current sampling temperature is determined. For example, the corresponding relationship between the control degree and the illuminance of each of the LEDs at the current sampling temperature is that, control degree 1 corresponds to Lux_c1, control degree 2 corresponds to Lux_c2, the control degree 3 corresponds to Lux_c3 . . . control degree N corresponds to Lux_cN. When the illuminance each of the LEDs at the current sampling temperature is determined as Lux_c2, the control degree of each of the LEDs at the current sampling temperature can be determined as control degree 2.

In a specific embodiment, step S200 specifically comprises: step 210, determining illumination percentage of each of the LEDs based on the target color; step 220, determining the illuminance of each of the LEDs at the current sampling temperature based on the target illuminance and the illuminance percentage of each of the LEDs.

Specifically, different colors of the LEDs correspond to different illuminance percentages. The target light combining value comprises the target color and the target illuminance. In this implementation, when determining the illuminance of each of the LEDs at the current sampling temperature according to the target light combining value, the illuminance percentage of each of the LEDs is determined first according to the target color and a pre-stored corresponding relationship between the color and the illuminance percentage. Then the illuminance of each of the LEDs at the current sampling temperature is determined according to the target illuminance and the illuminance percentage of each of the LEDs. For example, if the target illuminance is S, the illuminance percentage of LED1 is P1, the illuminance percentage of LED2 is P2, the illuminance percentage of LED3 is P3, the illuminance percentage of LED4 is P4, and the illuminance percentage of LED5 is P5, the illuminance of LED1 is S*P1, the illuminance of LED2 is S*P2, the illuminance of LED3 is S*P3, the illuminance of LED4 is S*P4, and the illuminance of LED5 is S*P5.

Step S300, according to the control degree of each of the LEDs at the current sampling temperature, controlling each of the LEDs to combine light.

Specifically, after determining the control degree of each of the LEDs at the current sampling temperature, according to the control degree of each of the LEDs at current sampling temperature, each of the LEDs is controlled to combine light. Since the control degree of each of the LEDs at the current sampling temperature is determined according to the target light combining value and the corresponding relationship between the control degree and the illuminance at the current sampling temperature, each of the LEDs can be controlled to emit light amount corresponding to the control degree at the current sampling temperature for combining light, so as to obtain the target light combining value and avoid color temperature drift caused by temperature changes.

In a specific embodiment, step S300 specifically comprises: S310, outputting the control degree of each of the LEDs at the current sampling temperature to a LED driver circuit of each of the LEDs; S320, by the LED driving circuit of each of the LEDs, according to the control degree of each of the LEDs at the current sampling temperature, driving each of the LEDs to combine light.

Figure 2:
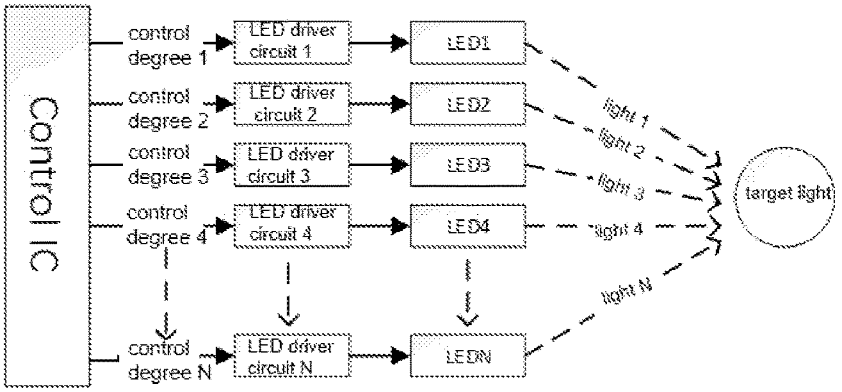
FIG. 2 is a schematic flowchart of controlling each of the LEDs to combine light according to an embodiment of the present disclosure.

Specifically, each of the LEDs has its corresponding LED driving circuit. When controlling each of the LEDs to combine light according to the control degree of each of the LEDs at the current sampling temperature, the control degree of each of the LEDs at the current sampling temperature is output to the LED driving circuit of each of the LEDs, and each of the LEDs is derived to combine light, by the LED driving circuit of each of the LEDs, according to the control degree of each of the LEDs at the current sampling temperature. For example, as shown in FIG. 2, the control degree of each of LED at the current sampling temperature, namely control degree1, control degree2, control degree3, control degree4 . . . control degree N, is respectively input into the LED driving circuit of each of the LEDs, namely LED driver 1, LED driver 2, LED driver 3, LED driver 4 . . . LED driver N which respectively controls LED1, LED2, LED3, LED4 . . . LEDN to combine light.

In a specific implementation, before step S100, the method of combining light further comprises: step R110, comparing the current sampling temperature with a previous sampling temperature; step R120, when difference between the current sampling temperature and the previous sampling temperature is less than a preset temperature threshold, determining the control degree of each of the LEDs at the previous sampling temperature as the control degree of each of the LEDs at the current sampling temperature.

In order to measure temperature change, the temperature threshold is preset in this embodiment. After obtaining the current sampling temperature, the current sampling temperature is compared with the previous sampling temperature. When the difference between the current sampling temperature and the previous sampling temperature is greater than or equal to the preset temperature threshold, it means that the temperature change will cause a large color temperature drift, then the control degree of each of the LEDs at the current sampling temperature is determined according to the aforementioned steps S100 and S200. When the difference between the current sampling temperature and the previous sampling temperature is less than the preset temperature threshold, it means that the temperature change is so small to cause a large color temperature drift, then the control degree of each of the LEDs at the previous sampling temperature is determined as the control degree of each of the LEDs at the current sampling temperature, thereby reducing amount of calculation when determining the control degree of each of the LEDs at the current sampling temperature.

Exemplary Device

Figure 3:
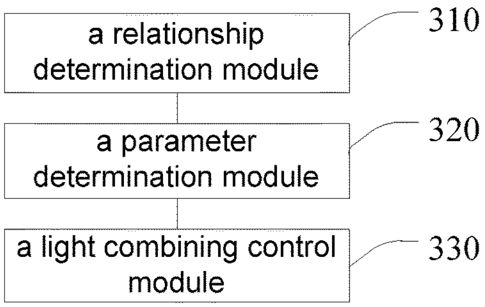
FIG. 3 is a schematic block diagram of a device of combining light provided by an embodiment of the present disclosure.

As shown in FIG. 3, an embodiment of the present disclosure provides a device of combining light. The device comprises a relationship determination module 310, a parameter determination module 320 and a light combining control module 330. Specifically, the relationship determination module 310 is used to determine corresponding relationship between control degree and illuminance of each of LEDs at a current sampling temperature, according to the current sampling temperature. The parameter determination module 320 is used to determine the control degree of each of the LEDs at the current sampling temperature, according to a target light combining value and the corresponding relationship between the control degree and the illuminance of each of the LEDs at the current sampling temperature. The light combining control module 330 is used to control each of the LEDs to combine light, according to the control degree of each of the LEDs at the current sampling temperature.

Figure 4:
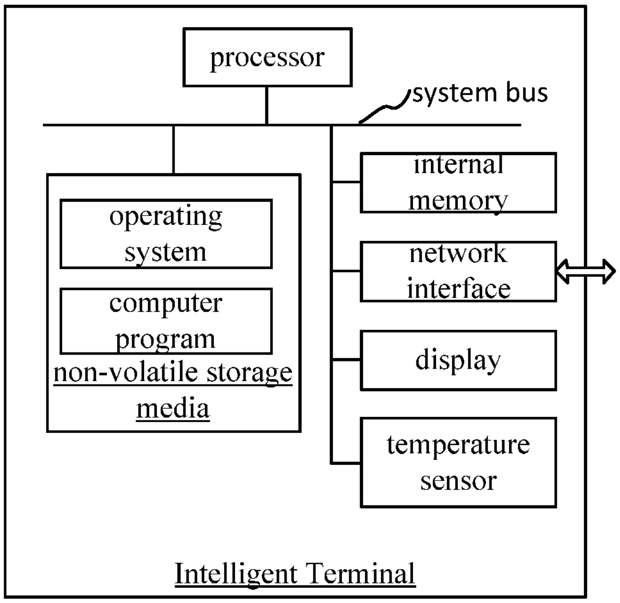
FIG. 4 is a schematic block diagram of internal structure of an intelligent terminal provided by an embodiment of the present disclosure.

Based on the above embodiments, the present disclosure also provides an intelligent terminal, the principle block diagram of which can be shown in FIG. 4. The intelligent terminal comprises a processor, a memory, a network interface, a display screen, and a temperature sensor connected through a system bus. The processor of the intelligent terminal is used to provide computing and control capabilities. The memory of the intelligent terminal comprises a non-volatile storage medium and an internal memory. The non-volatile storage medium stores an operating system and a computer program. The internal memory provides environment for operation of the operating system and computer programs in the non-volatile storage medium. The network interface of the intelligent terminal is used to communicate with external terminals through network connection. The computer program, when executed by the processor, implements a method of combining light. The display screen of the intelligent terminal may be a liquid crystal display screen or an electronic ink display screen, and the temperature sensor of the intelligent terminal is pre-set inside the intelligent terminal to detect operating temperature of internal equipments.

Those skilled in the art can understand that a principle block diagram shown in FIG. 4 is only a structural block diagram of a part related to a solution of the present disclosure and does not constitute a limitation on the intelligent terminal to which the present disclosure is applied. A specific intelligent terminal may comprise more or less components than those shown in the figures, or combine certain components, or have different arrangement of components.

In an embodiment, an intelligent terminal is provided, comprising: a processor; and a storage medium, communicatively connected to the processor and suitable for storing a plurality of instructions. The processor is suitable for invoking the following instructions so as to implement the steps of the method of combining light in above embodiments, such as the step S100 to S300 shown in FIG. 1 which comprises: according to a current sampling temperature, determining corresponding relationship between control degree and illuminance of each of LEDs at the current sampling temperature; according to a target light combining value and the corresponding relationship between the control degree and the illuminance of each of the LEDs at the current sampling temperature, determining control degree of each of the LEDs at the current sampling temperature; according to the control degree of each of the LEDs at the current sampling temperature, controlling each of the LEDs to combine light.

Those skilled in the art can understand that all or part of the processes in the methods of the above embodiments can be implemented by instructing relevant hardware through a computer program, and the computer program can be stored in a non-volatile computer-readable storage medium. When the computer program is executed, it may comprise the processes of the embodiments of the above-mentioned methods. Any reference to a memory, storage, database or other medium used in the various embodiments provided herein may comprise non-volatile and/or volatile memory. Non-volatile memory can comprise read only memory (ROM), programmable ROM (PROM), electrically programmable ROM (EPROM), electrically erasable programmable ROM (EEPROM), or Flash. Volatile memory may comprise random access memory (RAM) or external cache memory. By way of illustration and not limitation, RAM is available in a variety of forms, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), Memory Bus (Rambus) Direct RAM (RDRAM), direct Memory Bus Dynamic RAM (DRDRAM), and Memory Bus Dynamic RAM (RDRAM) etc.

To sum up the above, the present disclosure discloses a method of combining light, an intelligent terminal and a storage medium. The method comprises: according to a current sampling temperature, determining corresponding relationship between control degree and illuminance of each of LEDs at the current sampling temperature; according to a target light combining value and the corresponding relationship between the control degree and the illuminance of each of the LEDs at the current sampling temperature, determining control degree of each of the LEDs at the current sampling temperature; according to the control degree of each of the LEDs at the current sampling temperature, controlling each of the LEDs to combine light. By way of determining the corresponding relationship between the control degree and the illuminance at the current sampling temperature, and determining the control degree of each of the LEDs according to the target light combining value and the corresponding relationship between the control degree and the illuminance at the current sampling temperature, the present disclosure is able to compensate illuminance of each of the LEDs based on temperature change, and alleviate color temperature drift caused by temperature change through illuminance compensation of each of the LEDs.

It should be understood that application of the present disclosure is not limited to above examples. Improvement or alteration can be made by those ordinarily skilled in the art based on the above description, and all such improvement and alteration should fall within protection scope of appended claims of the present disclosure.

What is claimed is:

1. A method of combining light, comprising:

according to a current sampling temperature and a relationship between a temperature and a light efficacy corresponding to each of a plurality of LEDs, determining a light efficacy of the each of the LEDs at the current sampling temperature;

according to the light efficacy of the each of the LEDs at the current sampling temperature and a predetermined basic information, determining a corresponding relationship between a control degree and an illuminance of the each of the LEDs at the current sampling temperature, wherein the predetermined basic information comprises a light efficacy of the each of the LEDs at a reference temperature different from the current sampling temperature and a corresponding relationship between the control degree and the illuminance of the each of the LEDs at the reference temperature;

according to a target light combining value and the corresponding relationship between the control degree and the illuminance of the each of the LEDs at the current sampling temperature, determining a control degree of the each of the LEDs at the current sampling temperature; and according to the control degree of the each of the LEDs at the current sampling temperature, controlling the each of the LEDs to combine light, wherein the determining of the corresponding relationship between the control degree and the illuminance of the each of the LEDs at the current sampling temperature comprises:

according to the light efficacy of the each of the LEDs at the current sampling temperature and the light efficacy of the each of the LEDs at the reference temperature, determining a light efficacy ratio of the each of the LEDs at the current sampling temperature; and according to the light efficacy ratio of the each of the LEDs at the current sampling temperature and the corresponding relationship between the control degree and the illuminance of the each of the LEDs at the reference temperature, determining the corresponding relationship between the control degree and the illuminance of each of the LEDs at the current sampling temperature.

2. The method of combining light of claim 1, wherein the light efficacy ratio of the each of the LEDs at the current sampling temperature is equal to the light efficacy of the each of the LEDs at the current temperature divided by the light efficacy of the each of the LEDs at the reference temperature, and the illuminance of the each of the LEDs at the current sampling temperature is equal to a multiplication of the illuminance of the each of the LEDs at the reference temperature and the light efficacy ratio of the each of the LEDs at the current sampling temperature.

3. The method of combining light of claim 1, wherein the determining of the control degree of the each of the LEDs at the current sampling temperature comprises:

according to the target light combining value, determining the illuminance of the each of the LEDs at the current sampling temperature; and according to the illuminance of the each of the LEDs at the current sampling temperature and the corresponding relationship between the control degree and the illuminance of the each of the LEDs at the current sampling temperature, determining the control degree of the each of the LEDs at the current sampling temperature.

4. The method of combining light of claim 3, wherein the target light combining value comprises a target color and a target illuminance, and the determining of the illuminance of the each of the LEDs at the current sampling temperature comprises:

determining an illuminance percentage of the each of the LEDs based on the target color; and determining the illuminance of the each of the LEDs at the current sampling temperature based on the target illuminance and the illuminance percentage of the each of the LEDs.

5. The method of combining light of claim 4, wherein the illuminance of the each of the LEDs at the current sampling temperature is equal to a multiplication of the target illuminance and the illuminance percentage of the each of the LEDs.

6. The method of combining light of claim 1, wherein the controlling of the each of the LEDs to combine light comprises:

outputting the control degree of the each of the LEDs at the current sampling temperature to a LED driver circuit of the each of the LEDs; and by the LED driving circuit of the each of the LEDs, according to the control degree of the each of the LEDs at the current sampling temperature, driving the each of the LEDs to combine light.

7. The method of combining light of claim 1, wherein before the determining of the corresponding relationship between the control degree and the illuminance of the each of the LEDs at the current sampling temperature, the method further comprises:

comparing the current sampling temperature with a previous sampling temperature; and when a difference between the current sampling temperature and the previous sampling temperature is less than a preset temperature threshold, determining a control degree of the each of the LEDs at the previous sampling temperature as the control degree of the each of the LEDs at the current sampling temperature.

8. An intelligent terminal, comprising:

a processor; and a storage medium, communicatively connected to the processor and suitable for storing a plurality of instructions, wherein the processor is suitable for invoking the instructions in the storage medium so as to be configured to perform:

according to a current sampling temperature and a relationship between a temperature and a light efficacy corresponding to each of a plurality of LEDs, determining a light efficacy of the each of the LEDs at the current sampling temperature;

according to the light efficacy of the each of the LEDs at the current sampling temperature and a predetermined basic information, determining a corresponding relationship between a control degree and an illuminance of the each of the LEDs at the current sampling temperature, wherein the predetermined basic information comprises a light efficacy of the each of the LEDs at a reference temperature different from the currently sampling temperature and a corresponding relationship between the control degree and the illuminance of the each of the LEDs at the reference temperature;

according to a target light combining value and the corresponding relationship between the control degree and the illuminance of the each of the LEDs at the current sampling temperature, determining a control degree of the each of the LEDs at the current sampling temperature; and according to the control degree of the each of the LEDs at the current sampling temperature, controlling the each of the LEDs to combine light, wherein to perform the determining of the corresponding relationship between the control degree and the illuminance of the each of the LEDs at the current sampling temperature, the processor is configured to perform:

according to the light efficacy of the each of the LEDs at the current sampling temperature and the light efficacy of the each of the LEDs at the reference temperature, determining a light efficacy ratio of the each of the LEDs at the current sampling temperature; and according to the light efficacy ratio of the each of the LEDs at the current sampling temperature and the corresponding relationship between the control degree and the illuminance of the each of the LEDs at the reference temperature, determining the corresponding relationship between the control degree and the illuminance of each of the LEDs at the current sampling temperature.

9. The intelligent terminal of claim 8, wherein to perform the determining of the control degree of the each of the LEDs at the current sampling temperature, the processor is configured to perform:

according to the target light combining value, determining the illuminance of the each of the LEDs at the current sampling temperature; and according to the illuminance of the each of the LEDs at the current sampling temperature and the corresponding relationship between the control degree and the illuminance of the each of the LEDs at the current sampling temperature, determining the control degree of the each of the LEDs at the current sampling temperature.

10. The intelligent terminal of claim 9, wherein the target light combining value comprises a target color and a target illuminance, and to perform the determining of the illuminance of the each of the LEDs at the current sampling temperature, the processor is configured to perform:

determining an illuminance percentage of the each of the LEDs based on the target color; and determining the illuminance of the each of the LEDs at the current sampling temperature based on the target illuminance and the illuminance percentage of the each of the LEDs.

11. The intelligent terminal of claim 10, wherein the illuminance of the each of the LEDs at the current sampling temperature is equal to a multiplication of the target illuminance and the illuminance percentage of the each of the LEDs.

12. The intelligent terminal of claim 8, wherein to perform the controlling of the each of the LEDs to combine light, the processor is configured to perform:

outputting the control degree of the each of the LEDs at the current sampling temperature to a LED driver circuit of the each of the LEDs; and by the LED driving circuit of the each of the LEDs, according to the control degree of the each of the LEDs at the current sampling temperature, driving the each of the LEDs to combine light.

13. The intelligent terminal of claim 8, wherein before performing the determining of the corresponding relationship between the control degree and the illuminance of the each of the LEDs at the current sampling temperature, the processor is further configured to perform:

comparing the current sampling temperature with a previous sampling temperature; and when a difference between the current sampling temperature and the previous sampling temperature is less than a preset temperature threshold, determining a control degree of the each of the LEDs at the previous sampling temperature as the control degree of the each of the LEDs at the current sampling temperature.

14. The intelligent terminal of claim 8, wherein the light efficacy ratio of the each of the LEDs at the current sampling temperature is equal to the light efficacy of the each of the LEDs at the current temperature divided by the light efficacy of the each of the LEDs at the reference temperature, and the illuminance of the each of the LEDs at the current sampling temperature is equal to a multiplication of the illuminance of the each of the LEDs at the reference temperature and the light efficacy ratio of the each of the LEDs at the current sampling temperature.

* * * * *